(12) United States Patent
Pavlovic et al.

(10) Patent No.: US 9,611,553 B2
(45) Date of Patent: Apr. 4, 2017

(54) HYDROGEN AND OXYGEN GENERATOR

(71) Applicants: Dejan Pavlovic, Mississauga (CA); Nenad Pavlovic, Etobicoke (CA)

(72) Inventors: Dejan Pavlovic, Mississauga (CA); Nenad Pavlovic, Etobicoke (CA)

(*) Notice: Subject to any disclaimer, the term of this patent is extended or adjusted under 35 U.S.C. 154(b) by 432 days.

(21) Appl. No.: 13/664,551

(22) Filed: Oct. 31, 2012

(65) Prior Publication Data
US 2013/0105307 A1    May 2, 2013

Related U.S. Application Data

(60) Provisional application No. 61/628,411, filed on Oct. 31, 2011.

(51) Int. Cl.
| | |
|---|---|
| C25C 7/00 | (2006.01) |
| C25C 7/02 | (2006.01) |
| C25C 3/16 | (2006.01) |
| C25C 7/04 | (2006.01) |
| C25B 9/04 | (2006.01) |
| C25B 13/02 | (2006.01) |
| C25B 1/02 | (2006.01) |
| C25B 1/04 | (2006.01) |
| C25B 11/02 | (2006.01) |
| C25B 9/06 | (2006.01) |

(52) U.S. Cl.
CPC ............ *C25B 1/04* (2013.01); *C25B 9/06* (2013.01); *C25B 11/02* (2013.01); *Y02E 60/366* (2013.01)

(58) Field of Classification Search
CPC .... C25C 7/00; C25C 7/02; C25C 3/16; C25C 3/22; C25C 7/04; C25B 11/02; C25B 9/04; C25B 9/06; C25B 13/02; C25B 1/02

USPC ............. 204/288, 280, 288.1, 283, 284
See application file for complete search history.

(56) References Cited

U.S. PATENT DOCUMENTS

| | | | | |
|---|---|---|---|---|
| 4,457,816 A | * | 7/1984 | Galluzzo | C25B 9/04 |
| | | | | 204/270 |
| 6,007,686 A | * | 12/1999 | Welch | A61L 2/0011 |
| | | | | 204/230.2 |

(Continued)

*Primary Examiner* — Zulmariam Mendez
(74) *Attorney, Agent, or Firm* — Grant Tisdall; Gowling WLG (Canada) LLP

(57) ABSTRACT

A hydrogen generator for producing hydrogen and oxygen gases comprising a housing having an electrolyte reservoir and an electrolysis cell, an electrical power source; a plurality of axially spaced-apart alternating positive and negative electrode plates mounted concentrically and separated from each other by a peripheral sealing ring in the electrolysis chamber; a pair of opposite tabs formed on the perimeter of the plates with openings for receiving an electrode support rod therein, positive electrode plates connected to a positive electrode support rod and negative electrode plates connected to a negative electrode support rod for electrically connecting the positive and the negative electrode plates to the power source, and fluid conduits for conveying liquid electrolyte from the reservoir to the electrolysis cell and for conveying hydrogen and oxygen gases from the electrolysis chamber; the electrode plates comprise a titanium plate having a 1-3 micron platinum coating, said plates preferably having a circular shape with a pair of diametric tabs formed on the edge thereof, each tab having a central opening for receiving the electrode rod therein.

12 Claims, 15 Drawing Sheets

(56) References Cited

U.S. PATENT DOCUMENTS

| | | | | |
|---|---|---|---|---|
| 6,139,710 A | * | 10/2000 | Powell | C02F 1/52 |
| | | | | 204/672 |
| 2007/0035188 A1 | * | 2/2007 | Miller | H02K 5/141 |
| | | | | 310/64 |
| 2010/0200398 A1 | * | 8/2010 | Thiruppathi | C02F 1/4618 |
| | | | | 204/274 |

* cited by examiner

HYDROGEN AND OXYGEN GENERATOR

BACKGROUND OF THE INVENTION (i) Field of the Invention

The present invention relates to a hydrogen generating apparatus, and, more particularly, relates to a hydrogen gas and oxygen gas generating apparatus for use with internal combustion engines for improving the fuel efficiency and performance thereof.

(ii) Description of the Related Art

It is well known to decompose water into its basic constituents of hydrogen and oxygen by passing an electric current between an anode and cathode immersed in a dilute aqueous solution of an alkali such as sodium or potassium hydroxide or sodium chloride. Typical electrodes comprise iron cathodes and nickel plated anodes with non-conductive diaphragms spacing the anodes from the cathodes.

U.S. Pat. No. 4,726,888 describes an apparatus for decomposing water to produce hydrogen and oxygen in which a combination of low voltage electrodes forming electrolytic cells for major electrolysis and high voltage electrodes straddling the low voltage electrodes for reducing the resistance of the electrolyte produces a synergistic effect to enhance the level and speed of electrolysis to produce yields of gases. The high and low voltage electrodes are formed of a ferrous metal base coated with a layer of platinum to inhibit corrosion and maximise electrode life.

U.S. Pat. No. 4,457,816 discloses an electrolysis apparatus for decomposing water into hydrogen and oxygen in an electrolytic solution typically of KOH wherein the electrodes are made of stainless steel or other steel alloy wrapped in a thin tool wrapping containing nickel-chromium for corrosion, resistance, U.S. Pat. No. 6,336,430 describes a hydrogen generating system for use in internal combustion engines wherein the hydrogen and oxygen produced are combined with the air/fuel mixture to the engine carburettor or fuel injectors to improve the efficiency of the engines. The electrolyte utilized within an electrolysis cell is a basic aqueous solution comprised of 20 to 30% KOH and the electrodes are formed of stainless .steel, preferably nickel plated stainless steel.

SUMMARY OF THE INVENTION

It is a principal object of the present invention to provide ah improved process and apparatus for decomposition of water into hydrogen and oxygen for use in internal combustion engines.

It is another object of the invention to provide an improved electrode comprised of a titanium plate having a platinum coating for use as cathode or anode for enhanced hydrogen gas production.

In its broad aspect, the hydrogen generator of the invention for supplementing fuel in an internal combustion engine comprises a housing having an electrolyte reservoir and an electrolysis cell, a power source for providing electrical power to the electrolysis cell; a plurality of axially spaced-apart alternating positive and negative circular electrode plates mounted concentrically and separated from each other by a peripheral sealing ring to define the electrolysis ceil, in said electrolysis chamber, each of said electrode plates having a pair of diametric tabs formed on the perimeter thereof with openings for receiving an electrode support rod therein, said positive electrode plates connected to a positive electrode support, rod and said negative electrode plates connected to a negative electrode support rod, means for electrically connecting the positive electrode support rod and, the negative electrode support rod to the power source, fluid conduit means for conveying liquid electrolyte from the reservoir to the electrolysis cell and for conveying hydrogen and oxygen gases from the electrolysis chamber; and cooling means for maintaining a constant temperature in the generator.

More particularly, the electrode plate for use in a hydrogen generator comprises a titanium plate having a peripheral edge, a platinum coating having a thickness of 1-3 microns coated on said plate, said plate having a circular shape with a pair of diametric tabs formed on the edge thereof each tab having a central opening for receiving the electrode rod therein. The electrode plate comprises a circular plate having two pairs of radial slots formed therein perpendicular to each, other. Preferably, the slots in one pair of radial slots have a keyhole shape with a bulbous portion of each slot distal to the central hole.

In a preferred embodiment, the fluid conduit means comprise a feed passageway formed in a base of the electrolyte reservoir in the housing for communicating the reservoir with the interior of die electrolysis cell for gravity flow of electrolyte from the reservoir into an end of the electrolysis chamber and a discharge passageway formed in the housing at the opposite end of the electrolysis cell in communication with the electrolysis chamber extending upwardly to exit the housing above the reservoir discharges hydrogen and oxygen gases from the housing.

More preferably, the housing comprises a main body in which the electrolyte reservoir and the electrolysis chamber are located with the electrolysis chamber below the electrolyte reservoir, a first front cover closing the electrolysis chamber, an opening in the first front cover communicating with the interior of the electrolysis cell, a sealing ring surrounding the said opening in the front cover, means for securing the first front cover to the main, body, a second from cover conterminous with the main body, a sealing ring surrounding the reservoir, and means for securing the second front cover in abutment to the main body whereby the opening to the electrolysis chamber and the reservoir are liquid tight. The feed passageway for communicating the reservoir to the interior of the electrolysis cell is formed in the main body extending downwardly from the base of the reservoir to a rear of the electrolysis chamber, the discharge passageway at the opposite end of the electrolysis cell is formed in the second front cover with a lower entrance opening conterminous with the opening in the first front cover of the electrolysis chamber for fluid communication from the interior of the electrolysis cell to the discharge flow passage.

The means for electrically connecting the positive electrode support, rod and the negative electrode support rod to the power source comprises an electronic regulator, and a heat sink abutting the electronic regulator for cooling the electronic regulator and the electrolysis chamber, said heat sink having cooling fins exposed at a rear of the main body.

The first front cover is rectangular having four corners and in which the means for securing the first front cover to the main body comprise an electrically conductive bolt at each four corner thereof securing the first front cover to the main body, one of said bolts engaging tabs of the positive electrode plates and one other of said bolts engaging tabs of the negative electrode plate, and electrically conductive wires from the electronic regulator connected to said bolts whereby the bolts function as a positive electrode support rod and a negative electrode support rod.

The electrode plate for use in an electrolysis cell comprises a circular titanium plate having a platinum coating thereon, said titanium plate having a perimeter, a pair of diametric tabs formed on the perimeter of the titanium plate, each said tab having a hole formed thereon for receiving an electrode support, rod, and said platinum plate having a central hole and having two pairs of opposed radial slots formed therein perpendicular to each other. Each radial slot of one pair of opposed radial slots has a keyhole shape with, a narrow portion of the keyhole slot in proximity to the plate central hole. The platinum coating has a thickness of 1-3 microns and the hole is circular and formed in the center of each tab.

BRIEF DESCRIPTION OF THE DRAWINGS

The invention will now be described with respect to the accompanying drawings, in which.

DESCRIPTION OF THE PREFERRED EMBODIMENTS

Figure 1:
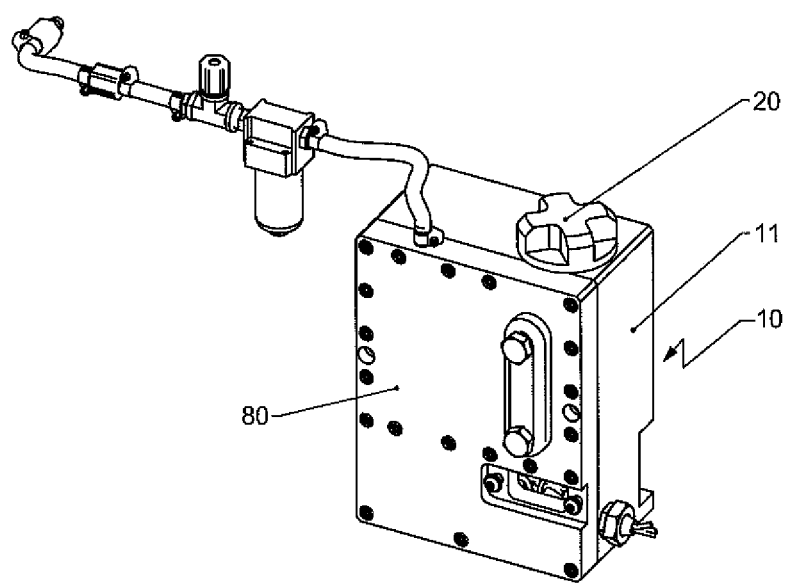
FIG. 1 is a front perspective view of the hydrogen and oxygen generating assembly of the present invention.
Figure 2:
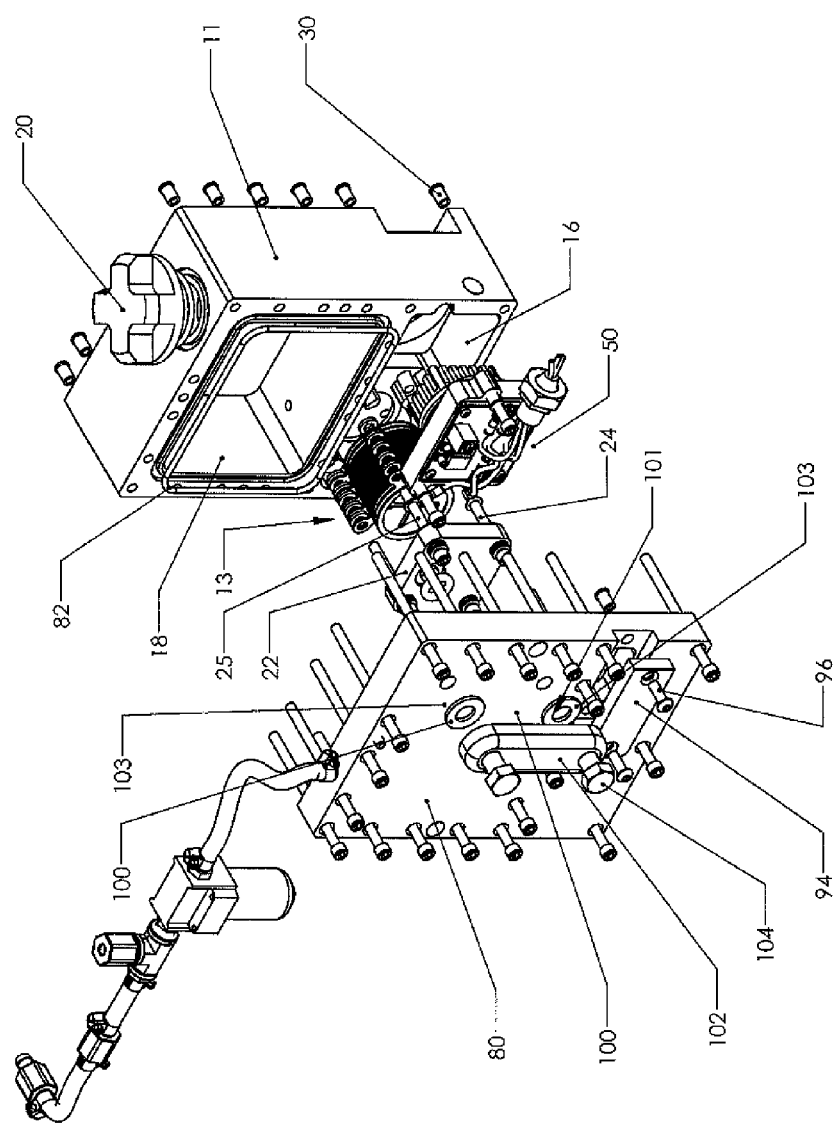
FIG. 2 is a front exploded perspective view of the hydrogen and oxygen, generating assembly shown in FIG. 1.
Figure 3:
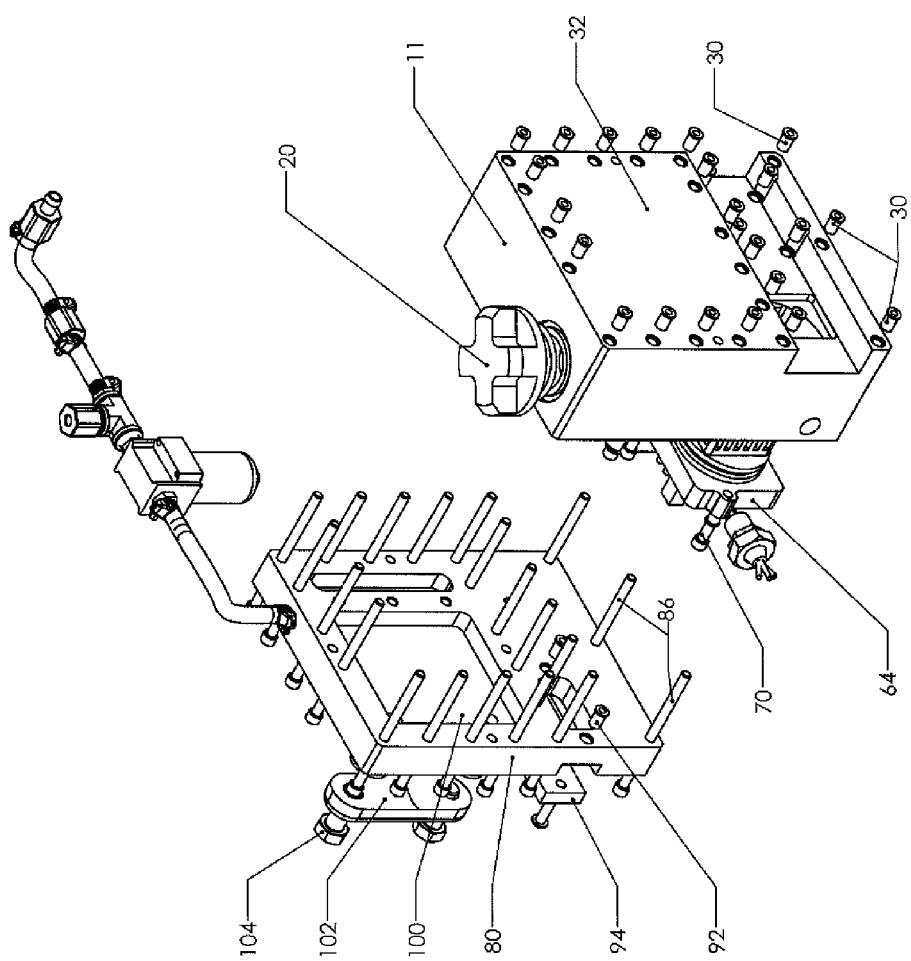
FIG. 3 is a rear exploded perspective view of the hydrogen and oxygen generator shown in FIG. 1.

With reference to FIGS. 1-3, the hydrogen generator 10 of the invention comprises a main body housing or box-case 11 having aft electrolysis cell compartment 12 and an electronic regulator compartment 16 formed in the bottom thereof below a liquid reservoir 18. A cap 20 with O-ring 21 is threaded onto the top of housing 11 for adding distilled water and electrolyte to reservoir 18.

With particular reference to FIGS. 4-7. electrolysis cell compartment 12 is adapted to receive a cell front cover 22 with a threaded connecting bolts 24 25 mounted in the corners thereof with flat washer 26 and locking spring washer 28 for connecting cover 22 to body 10 by nuts or threaded inserts 30 on the rear wall 32 of body 10. An O-ring 31 is mounted in annular groove 33 surrounding opening 35 for reasons which will become apparent as the description proceeds.

Figure 4:
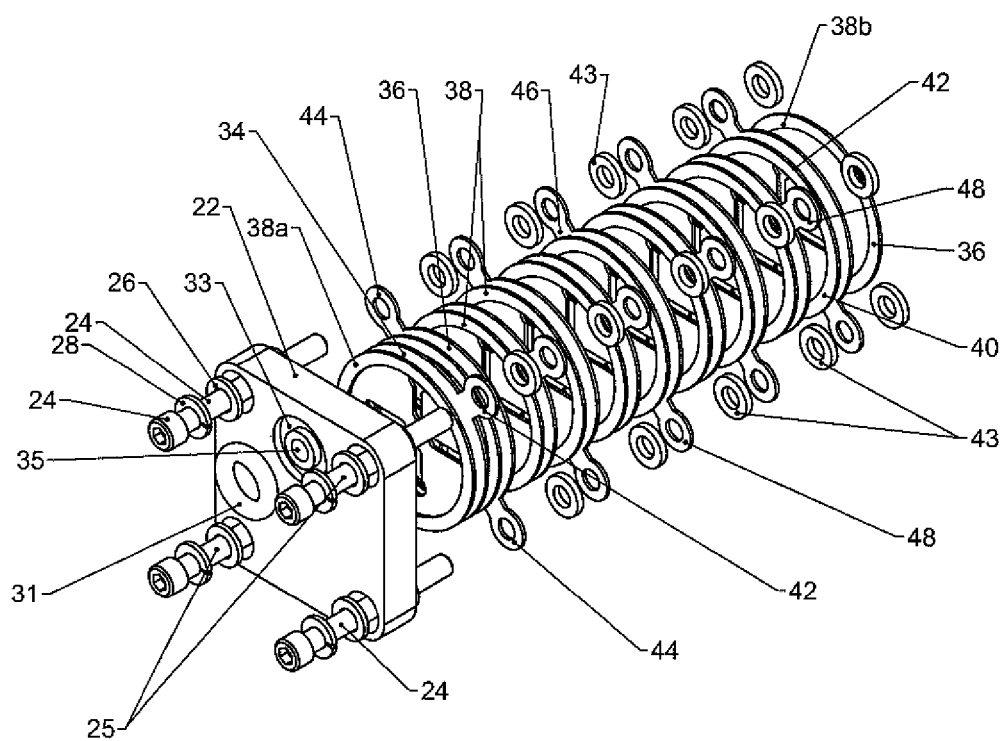
FIG. 4 is a front exploded view of the electrolysis cell assembly shown with electrode bolts and axially separated electrode plates and gaskets.
Figure 5:
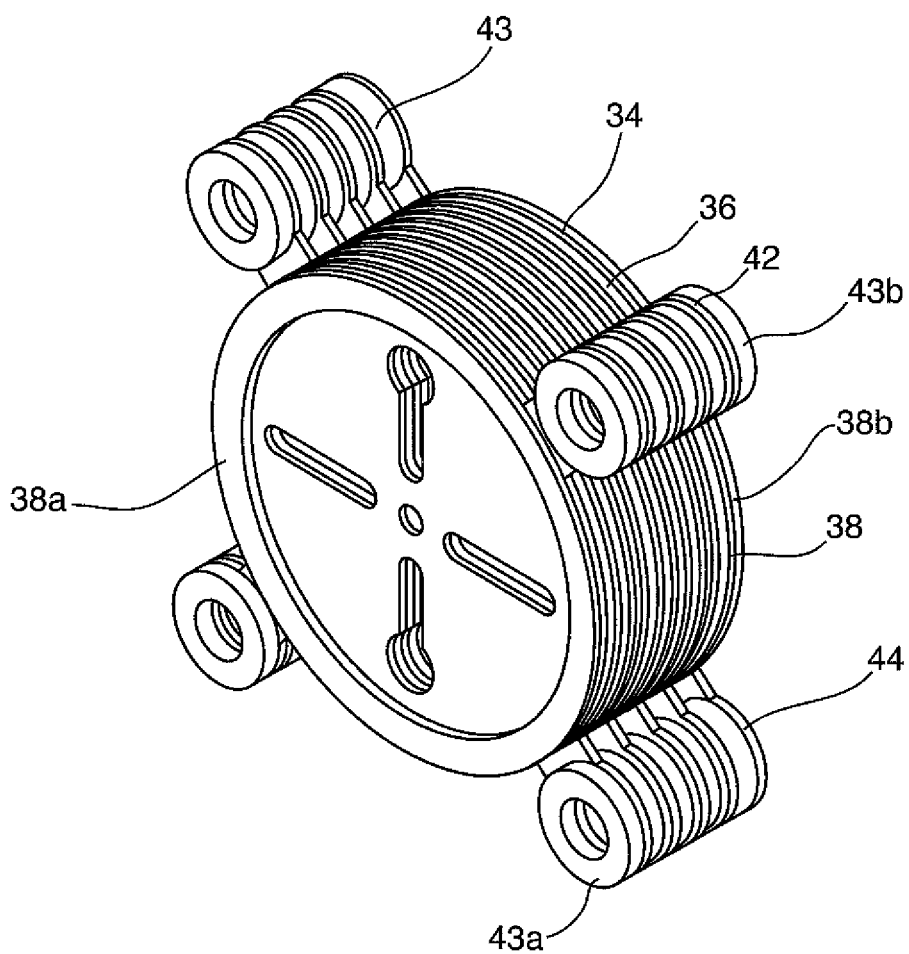
FIG. 5 is a perspective view of the electrode plates assembled with spacers.
Figure 6:
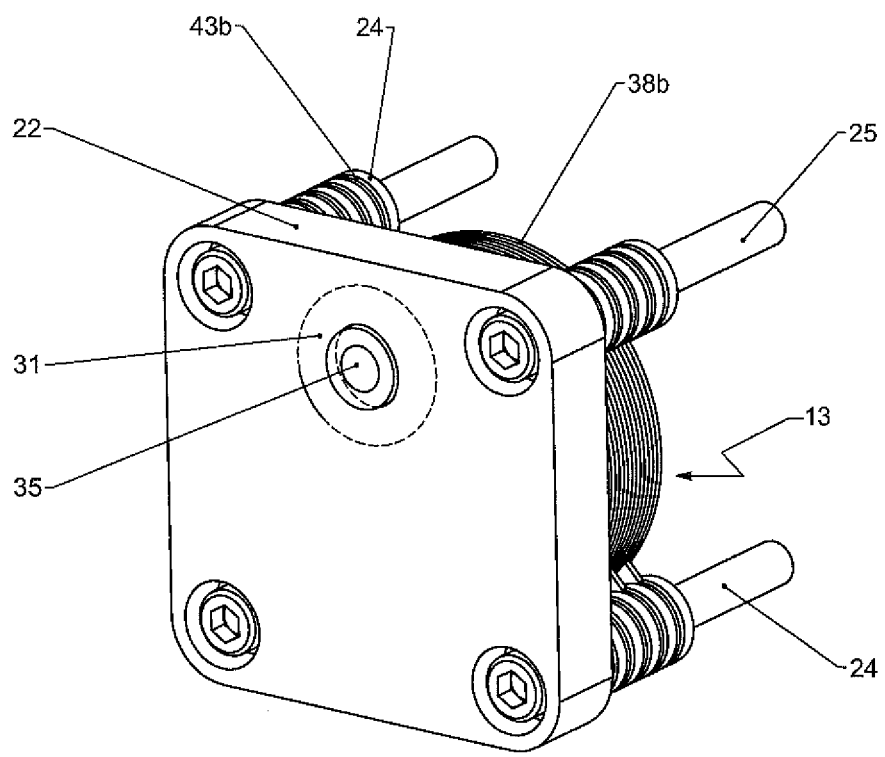
FIG. 6 is a trout perspective view of the electrolysis cell assembly shown in FIG. 5 with electrode plates assembled on electrode bolts.
Figure 11:
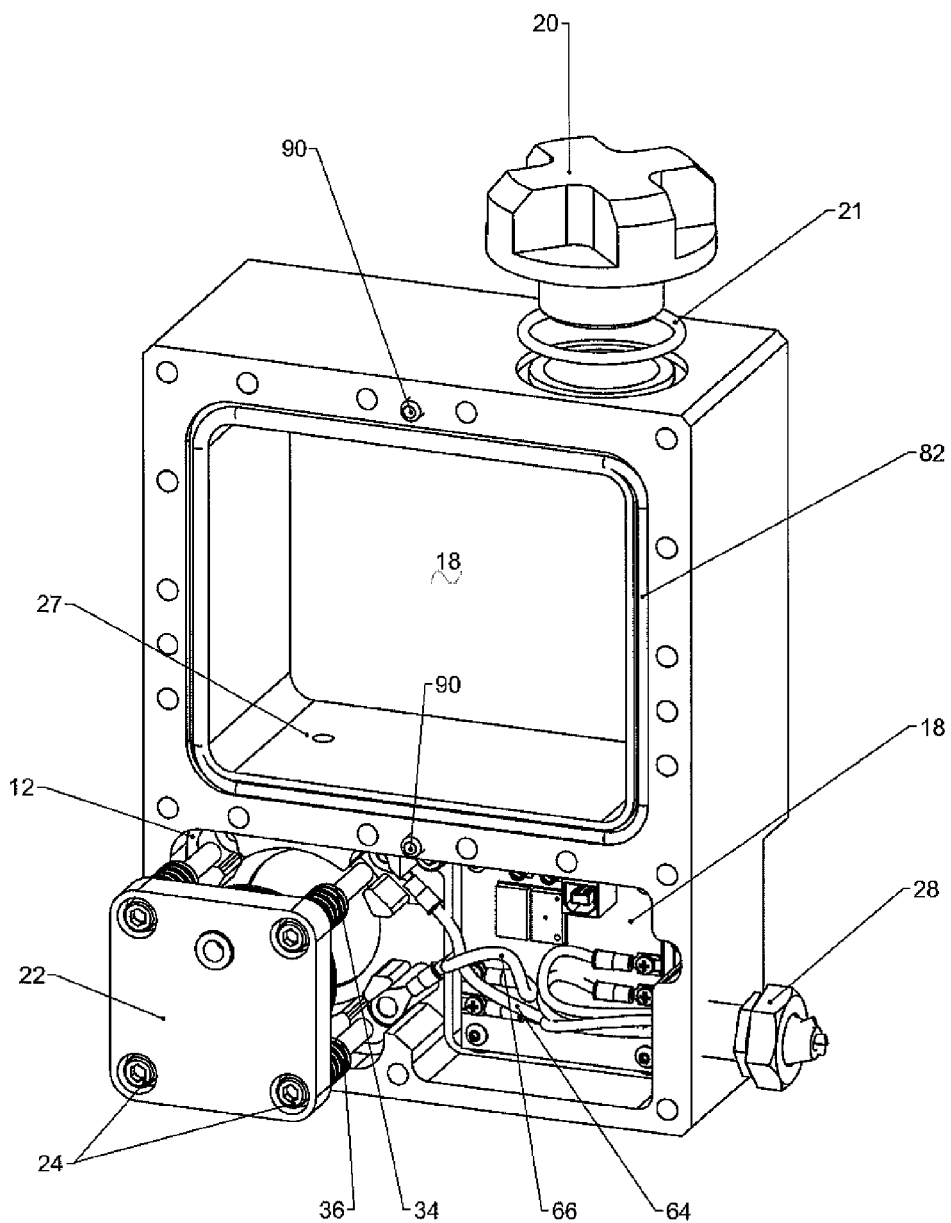
FIG. 11 is a front perspective view of the generator main body preparatory to mounting the electrolysis cell assembly therein.
Figure 12:
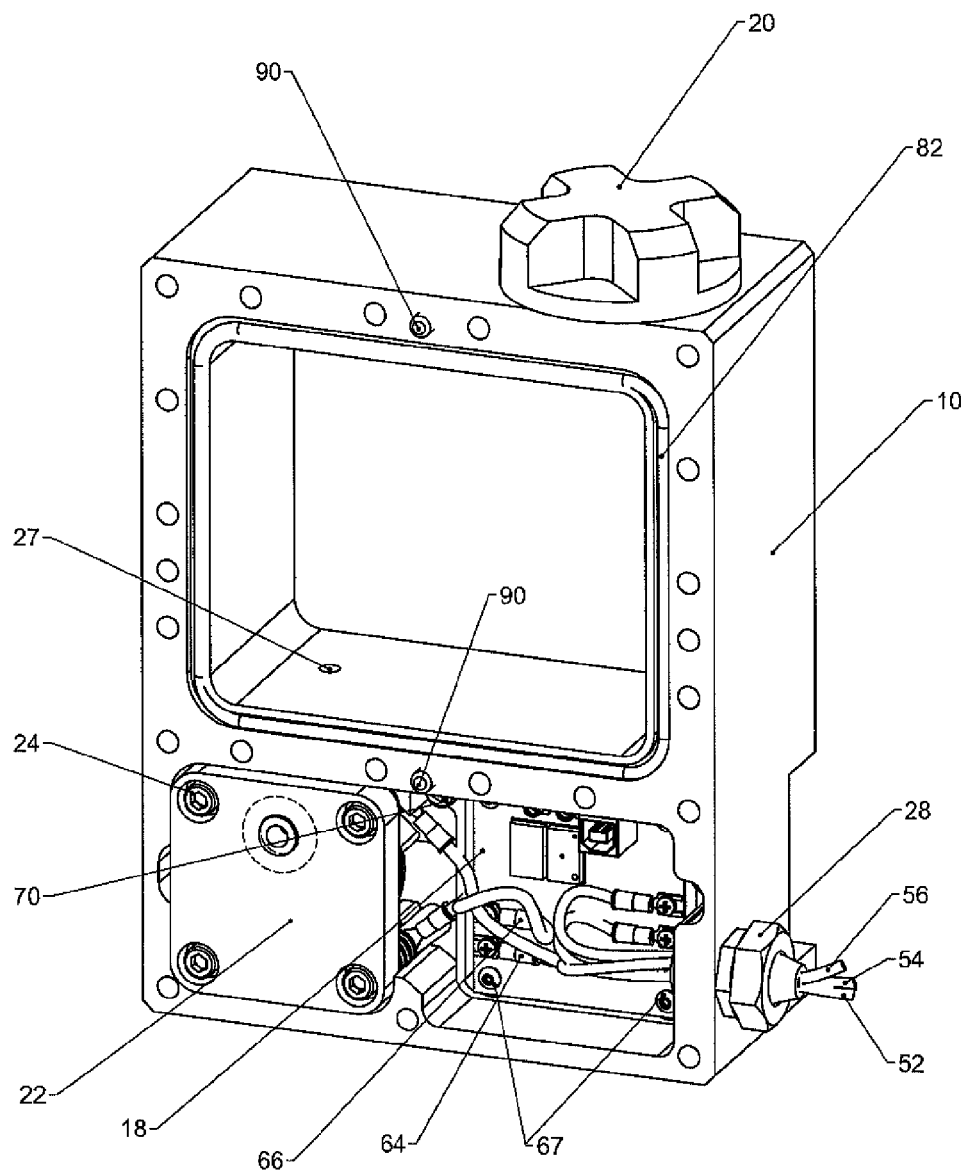
FIG. 12 is a front perspective view of the main housing with the electrolysis cell assembly and electronic regulator board mounted and wired therein.

A plurality of alternating positive electrode plates 34 and negative electrode plates 36 separated by sealing circumferential gaskets or spacers 38 are mounted on corner bolts 24, 25 as shown most clearly on FIGS. 4 and 6. Each positive and negative electrode plate 34, 36 has a pair of diametrically opposed circular tabs 42, 44 respectively having central holes 46, 48 for slidable mounting on bolts 24, 25 for stacking as indicated in FIGS. 5 and 6 and installing in compartment 12 as shown in FIGS. 11, 12. The tabs 42 of positive electrode plates 34 are mounted on diagonal electrode bolts 25 separated by dielectric spacer washers 40 and the tabs 44 of negative electrode plates 34 are mounted on opposed electrode bolts 24 separated by dielectric ring spacers 43.

FIG. 5 illustrates the assembled positive and negative electrode plates 34, 36 separated and uniformly, spaced apart by circumferential gaskets 38 with gaskets 38a and 38b at opposite ends to define a fluid-tight electrolysis cell 13. Positive electrode plate tabs and negative electrode tabs 42, 44 are separated and uniformly spaced apart by ring gaskets 43, with end ring gaskets 43a, 43b.

Figure 7:
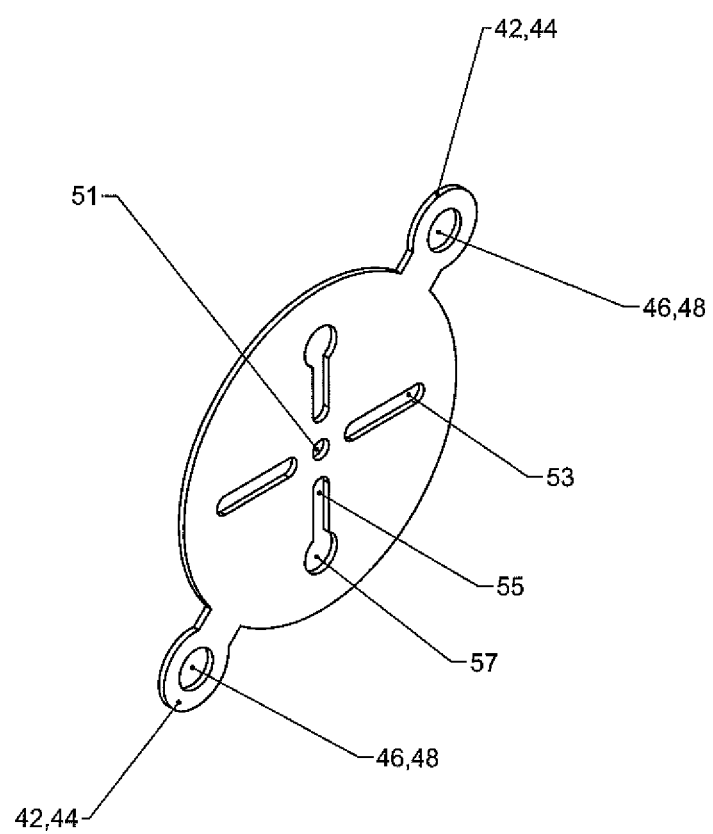
FIG. 7 is a perspective view of an electrode plate of the invention.
Figure 8:
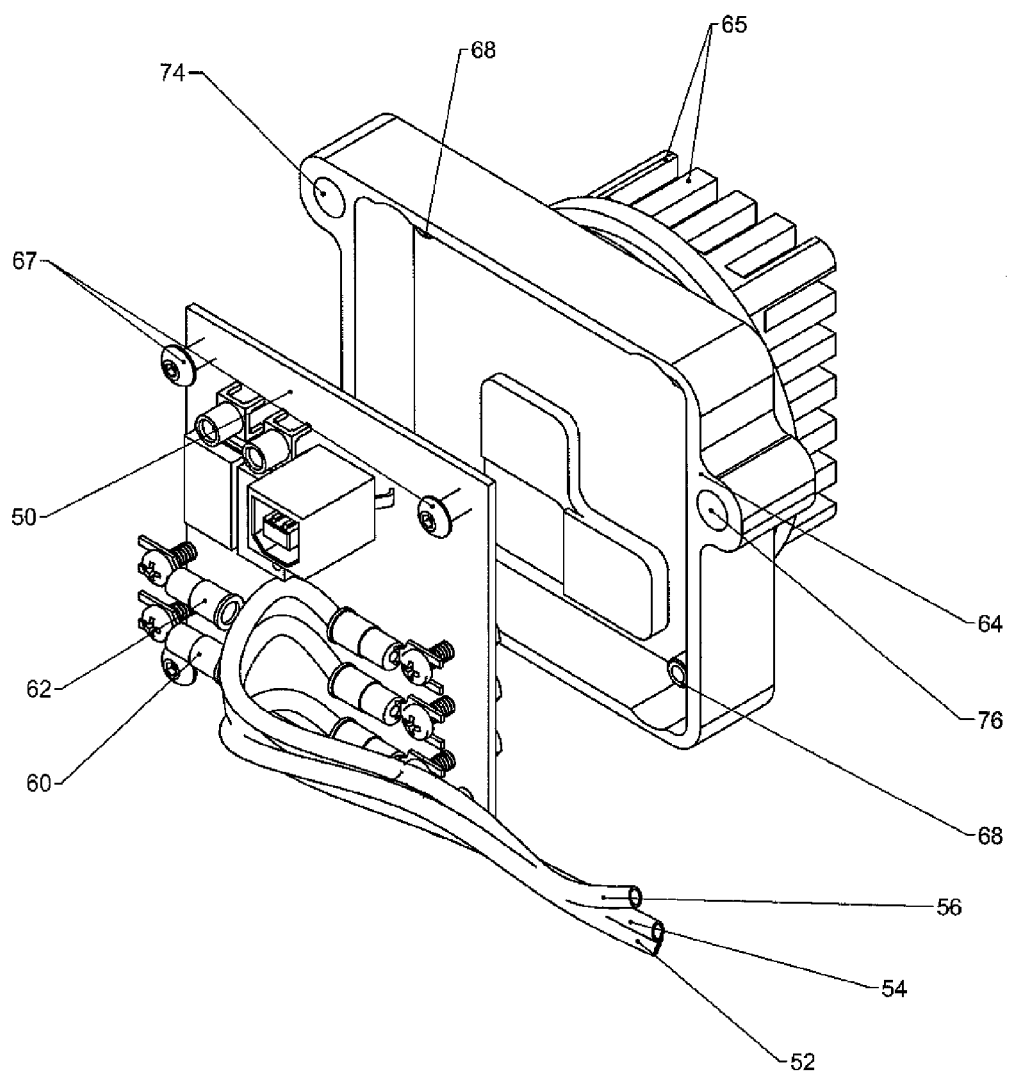
FIG. 8 is a front exploded perspective view of electronic regulator board preparatory to mounting on the heat sink.
Figure 9:
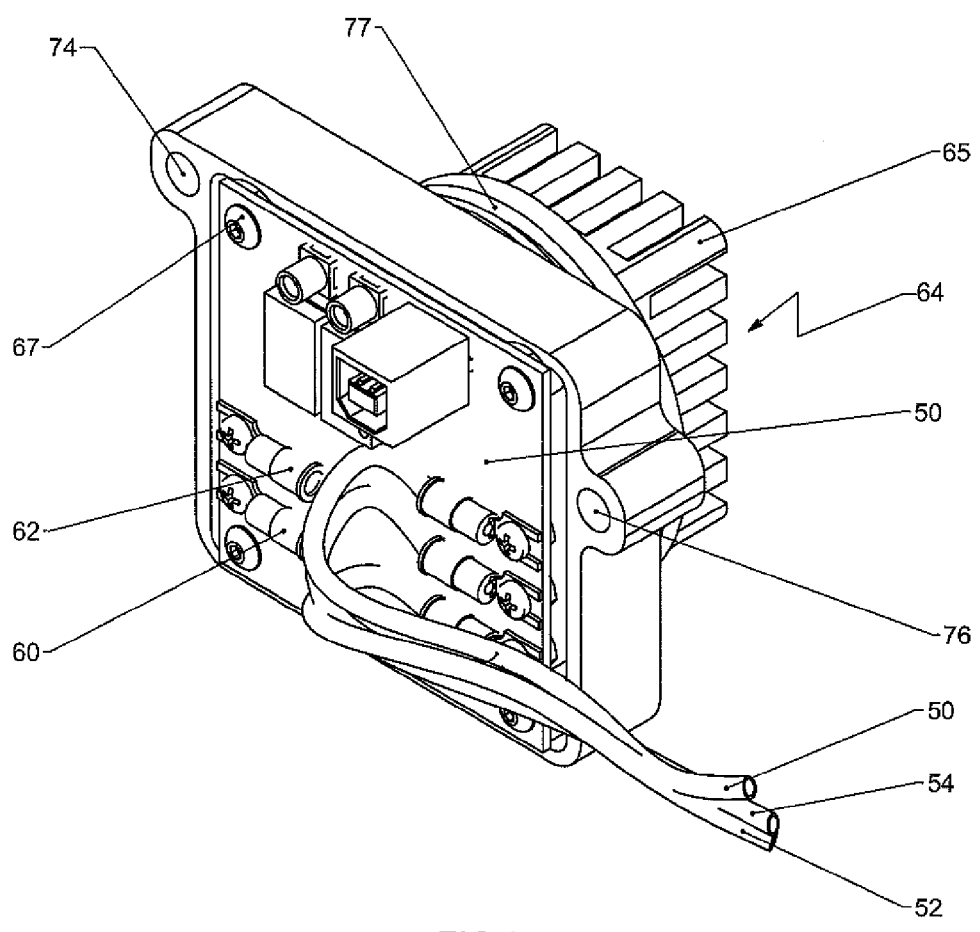
FIG. 9 is a front perspective view of the electronic regulator board shown in FIG. 8 mounted on the heat sink.
Figure 10:
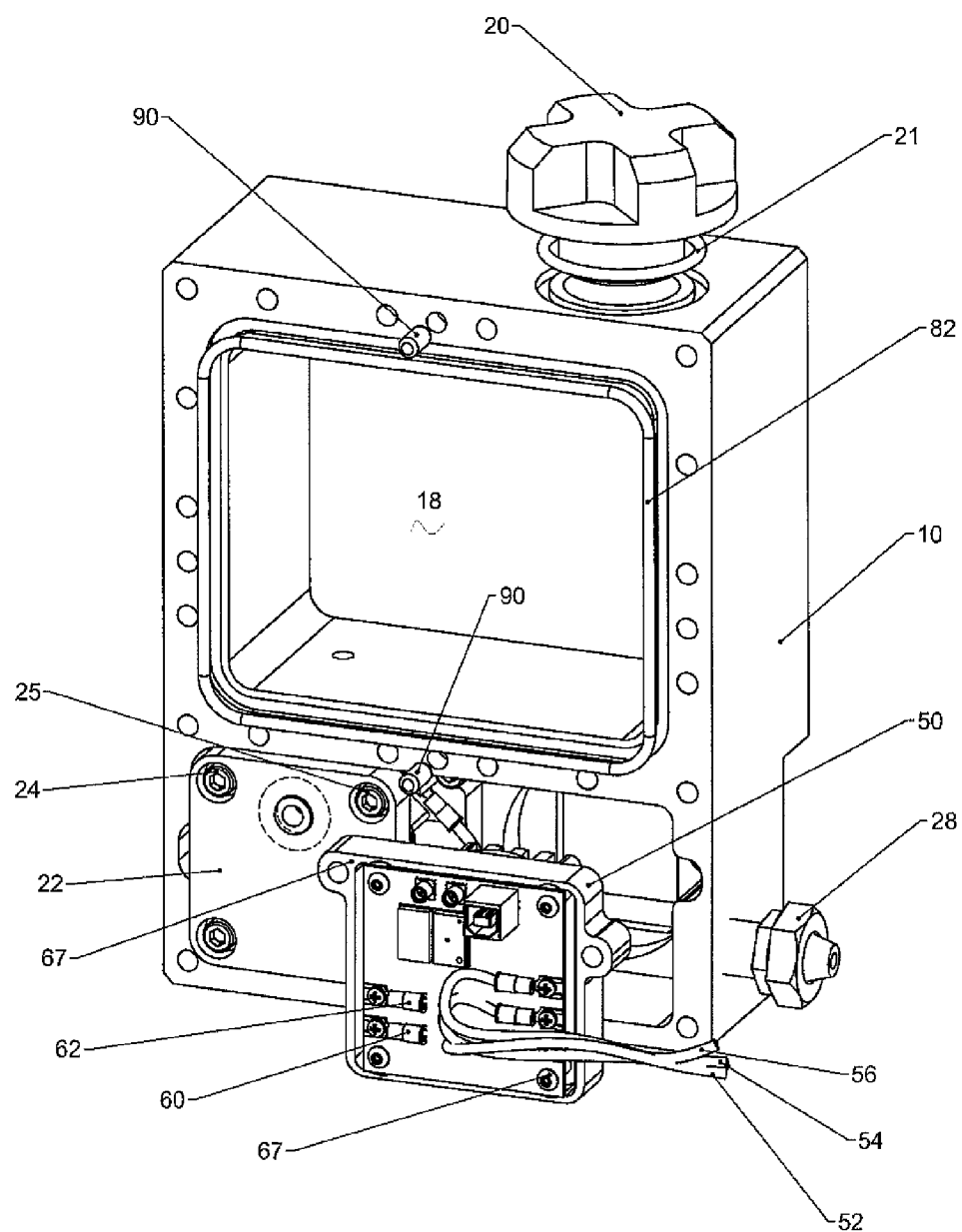
FIG. 10 is a front perspective view of the electronic regulator board and heat sink preparatory to mounting in the generator main body.

FIG. 7 illustrates circular electrode plates 34, 36, having diametric tabs 42, 44 with openings 46. 48. Fluid flow within the electrolysis cell 13 is permitted by central opening 51 and radial slots 53, 55. Slots 55 have a key-hole shape with the distal portion 57 enlarged to facilitate fluid flow into and out of the interior of the electrolysis cell. Each of plates 34, 36 is formed of titanium with a 1 to 3 micron thickness of platinum coated thereon to enhance electrical conductivity. Although circular electrode plates are shown, it will he understood that the plates can have other shapes such as elliptical or rectangular.

Figure 14:
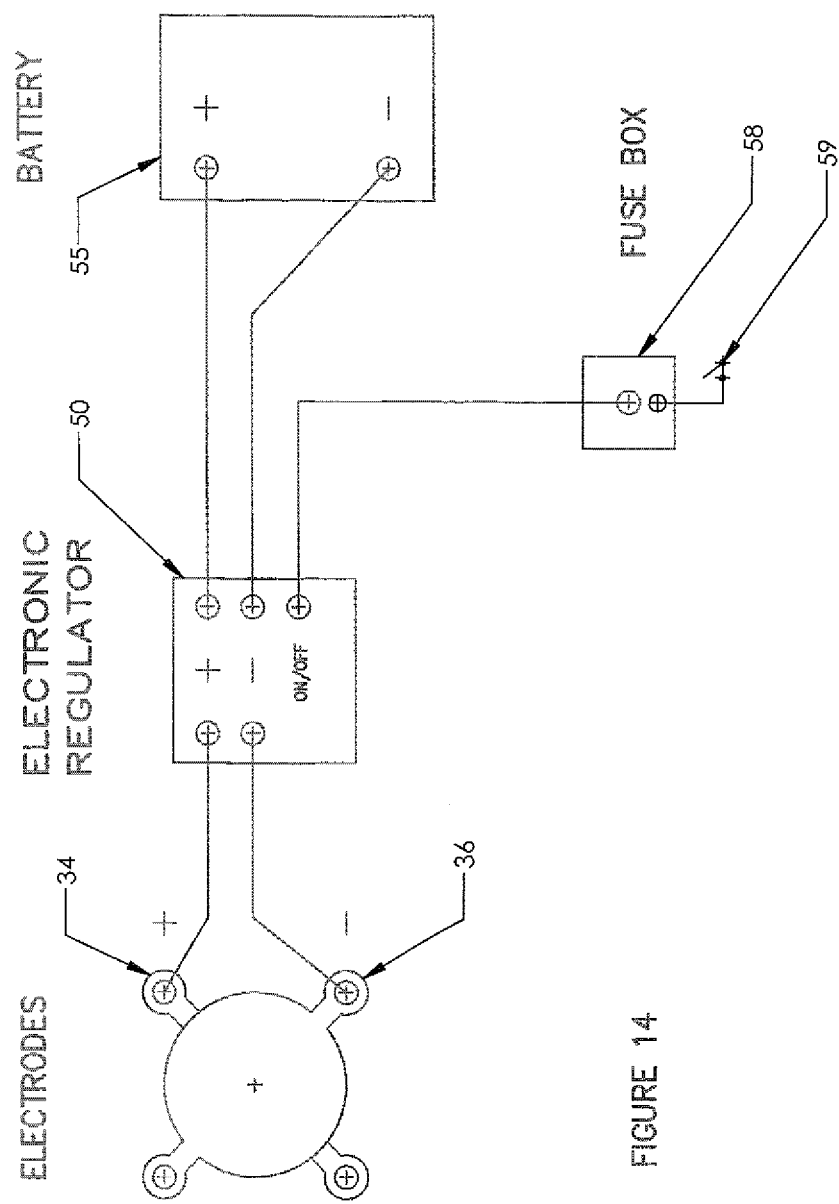
FIG. 14 is a basic schematic diagram of the electric circuit of the invention.

With reference now to FIGS. 8-11, electronic regulator 50 has positive wire 52 and negative wire 54 from power supply 55, shown in FIG. 14, an on/off wire 56 to fuse box 58 in series with a master normally closed switch 59 accessible to the operator, or incorporated in a vehicle ignition switch. Connectors 60, 62 are provided for connecting positive and negative wires 64, 66 to anode and cathode electrodes 34, 36 respectively. Electronic regulator 50 is provided with circuitry for controlling and regulating electrical power to the electrolysis cell. The regulator 50 is connected to the electrical system of the motor vehicle, typically a 12-volt DC battery, to provide a source of the power in the typical range of 20 to 700 watts, preferably 20 to 300 watts, to the electrolysis cell to produce the desired level of hydrogen gas generation.

Electronic regulator 50 is secured to heat sink 64 projecting from the rear of housing 10 by mounting screws 67 threaded into posts 68 and the units 14, 16 mounted in compartment 18 by a pair of bolts 70 through holes 74, 76. Heat sink 64 has a plurality of radiating-fins 65 for dissipating heat during electrolysis. O-ring 77 is located on the face of heat sink 64 to prevent moisture entering the generator.

Figure 13:
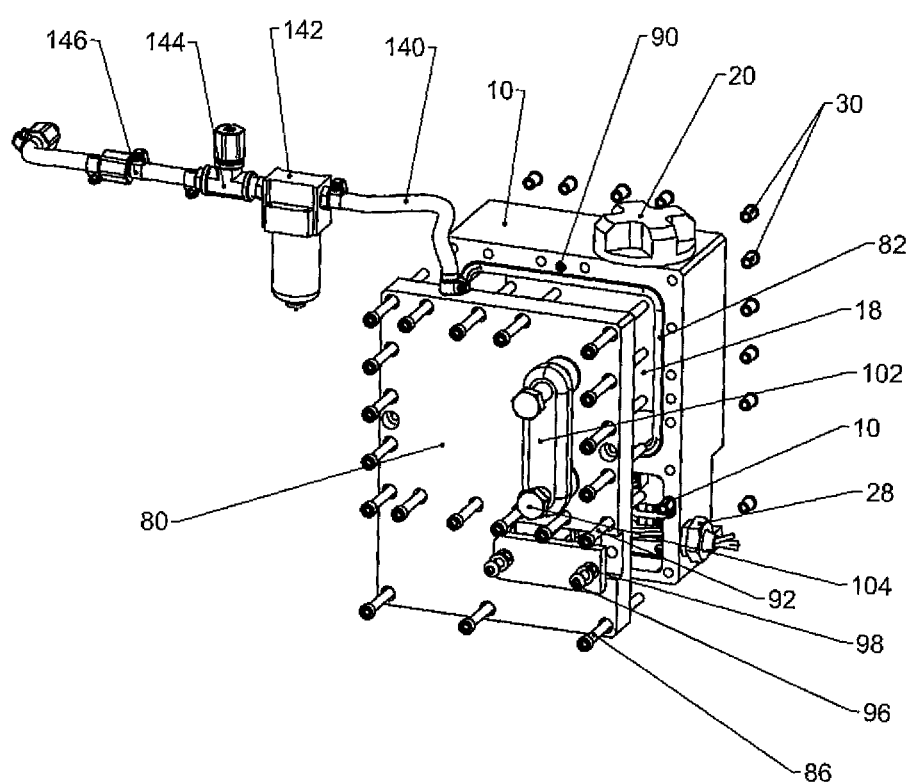
FIG. 13 is a front partially exploded perspective view of the front cover with gas discharge line preparatory to mounting on the generator main body.

As shown in FIG. 13, front body cover 80 is adapted to close and seal reservoir 18 with O-ring gasket 82 by bolts 86 threaded into mating nut inserts 30 mounted in the rear surface of main body 11, using dowel pins 90 for alignment. Body cover 80 has rectangular opening 92 for access and inspection of electronic board 14, with cover 94 adapted to close and seal opening 92 with screws 96 and lock washers 98. Vertical slot opening 100 has water glass cover 102 for viewing and checking liquid level in reservoir 18. Glass cover 102 with O-ring gaskets 103 is connected to body cover 80 by a pair of mounting bolts 104.

FIG. 14 illustrates schematically the electrical circuit of the invention in which tabs of positive electrode plates 34 and negative electrode plates 36 are electrically connected to regulator 130 and then to a power supply 132, normally a vehicle battery. Off/on switch 59 accessible to the operator of a vehicle is connected to an off/on connection on the regulator 130 via a fuse box 136.

The body 10 and cover 80 are formed of a plastic inert to the electrolyte solution, such as Delrin® plastic produced by Dupont, providing dimensional stability and toughness and for electrical insulation and isolation of components.

Figure 15:
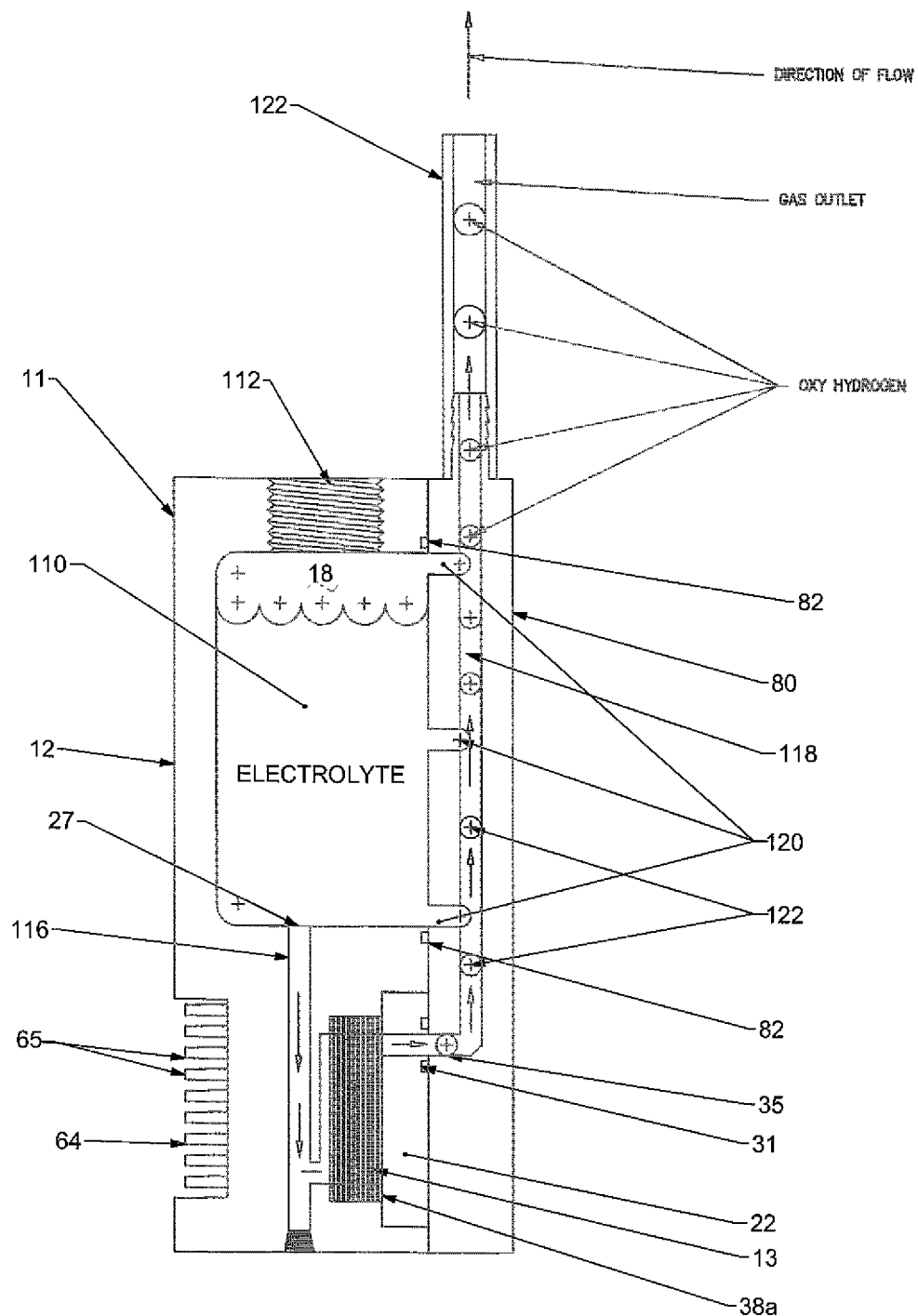
FIG. 15 is vertical side section of the hydrogen and oxygen generator of the invention illustrating the liquid and gas fluid flow conduits within the generator main body, body cover and gas discharge hose.

Turning to FIG. 15, the electrolyte solution 110 is fed into reservoir 18 through filler spout 112 and the reservoir closed by the threaded cap. The electrolyte solution 110 may be a KOH or NACL solution, preferably a 20 to 53% KOH solution well known in the art to be resistant to freezing at temperatures down to at least −55° C. A desired level of electrolyte as viewed through glass port 102 is maintained by adding water through filler spout 112. The electrolysis of electrolyte decomposes water only to hydrogen and oxygen gases, thereby maintaining the concentration, of electrolyte in the desired concentration range and necessitating the topping up of water only.

The electrolyte solution 110 flows through fluid feed hole 27 by gravity down bore passageway 116 into the interior of electrolysis cell 13 in electrolysis chamber 12 in contact with stacked positive and negatives electrodes 34, 36 and up bore passageway 116 for recycle to reservoir 18 by way of return ports 120.

The hydrogen and oxygen gases generated by electrolysis cell 13 rise as bubbles 122 through passageway 118 into conduit 122 to coalesce and be fed through line 140, water interceptor 142 to dry the gases, and then through a safety release valve 144 and non return valve 146 to an engine carburetor, fuel injector or intake manifold downstream of the fuel delivery system (not shown). A flame arrestor valve preferably is provided downstream of the non return valve 146.

Table 1 illustrates the volume of hydrogen and oxygen gases generated by the apparatus of the invention at current, amperage ranging from 1 ampere to 25 amperes and higher at ambient pressures and temperatures indicated. The volume of hydrogen and oxygen increased to 0.24 liter at 10 amperes.

| SL. NO. | CURRENT (AMPS.) | VOLUME (LPM) | PSIA | TEMP. ° C. |
| --- | --- | --- | --- | --- |
| 1. | 1 | 0.026 | 14.26 | 25.5 |
| 2. | 2 | 0.050 | 14.27 | 26.2 |
| 3. | 3 | 0.75 | 14.28 | 26.39 |
| 4. | 4 | 0.102 | 14.26 | 26.50 |
| 5. | 5 | 0.125 | 14.26 | 26.64 |
| 6. | 6 | 0.150 | 14.26 | 26.75 |
| 7. | 7 | 0.175 | 14.27 | 26.76 |
| 8. | 8 | 0.200 | 14.27 | 26.79 |
| 9. | 9 | 0.225 | 14.27 | 26.82 |
| 10. | 10 | 0.240 | 14.28 | 26.85 |

It will be understood that other embodiments and examples of the invention will be readily apparent to a person skilled in the art, the scope and purview of the invention, being defined in the appended claims.

We claim:

1. A hydrogen generator comprising:
    a housing having an upper electrolyte reservoir and a lower electrolysis chamber, an electrolysis cell located in said electrolysis chamber;
    said electrolysis cell comprising a plurality of axially spaced-apart alternating positive and negative electrode plates mounted concentrically within said electrolysis chamber, each of said positive and negative electrode plates having a platinum coating thereon and having a pair of opposite tabs formed on the perimeter thereof with openings for receiving an electrode support rod therein, said tabs of said positive electrode plates connected to a positive electrode support rod and said tabs of said negative electrode plates connected to a negative electrode support rod, each said positive and negative electrode plate having a circular shape, a central hole and two pairs of radial slots formed therein perpendicular to each other, each radial slot of each said pair of radial slots being on opposite sides of said central hole substantially equidistant from said central hole;
    means for electrically connecting the positive electrode support rod and the negative electrode support rod to a power source for providing electrical power to said electrolysis cell;
    fluid conduit means for conveying liquid electrolyte from the electrolyte reservoir to the electrolysis chamber and for conveying hydrogen and oxygen gases from the electrolysis chamber; and
    cooling means for maintaining a constant temperature.

2. The hydrogen generator as claimed in claim 1 comprising a titanium plate, wherein said platinum coating has a thickness of 1-3 microns.

3. The hydrogen generator as claimed in claim 1, wherein each said radial slot of at least one said pair of radial slots has a keyhole shape with a bulbous portion distal to the central hole.

4. The hydrogen generator as claimed in claim 1, in which the alternating positive and negative circular electrode plates are separated from each other by a sealing ring at the perimeter thereof, thereby defining an inner electrolysis chamber.

5. The hydrogen generator as claimed in claim 1, wherein the fluid conduit means comprise a feed passageway formed in a base of the electrolyte reservoir in the housing for communicating the electrolyte reservoir with the interior of the electrolysis cell for gravity flow of electrolyte from the electrolyte reservoir into an end of the electrolysis chamber, a discharge passageway formed in the housing at the opposite end of the electrolysis cell in communication with the electrolysis chamber extending upwardly to exit the housing above the electrolyte reservoir for discharge of hydrogen and oxygen gases from the housing.

6. The hydrogen generator as claimed in claim 5, in which the housing comprises a main body in which the electrolyte reservoir and the electrolysis chamber are located with the electrolysis chamber below the electrolyte reservoir, a first front cover closing the electrolysis chamber, an opening in the first front cover communicating with the interior of the electrolysis cell, a sealing ring surrounding the said opening in the front cover, means for securing the first front cover to the main body, a second front cover conterminous with the main body, a sealing ring surrounding the electrolyte reservoir, means for securing the second front cover in abutment to the main body whereby the opening to the electrolysis chamber and the reservoir are liquid tight.

7. The hydrogen generator as claimed in claim 6, in which the feed passageway for communicating the electrolyte reservoir to the interior of the electrolysis cell is formed in the main body extending downwardly from the base of the electrolyte reservoir to a rear of the electrolysis chamber, the discharge passageway at the opposite end of the electrolysis cell is formed in the second front cover with a lower entrance opening conterminous with the opening in the first front cover of the electrolysis chamber for fluid communication from the interior of the electrolysis cell to the discharge flow passage.

8. The hydrogen generator as claimed in claim 7, in which the means for electrically connecting the positive electrode support rod and the negative electrode support rod to the power source comprises an electronic regulator, and a heat sink abutting the electronic regulator for cooling the electronic regulator and the electrolysis chamber, said heat sink having cooling fins exposed at a rear of the main body.

9. The hydrogen generator as claimed in claim 8, in which the first front cover is rectangular having four corners and in which the means for securing the first front cover to the main body comprises a metal electrically conductive bolt at each four corner thereof securing the first front cover to the main body, one of said bolts engaging said tabs of the positive electrode plates and one other of said bolts engaging said tabs of the negative electrode plates, and electrically conductive wires from the electronic regulator connected to said bolts whereby the bolts function as said positive electrode support rod and said negative electrode support rod.

10. The hydrogen generator as claimed in claim 1, wherein said liquid electrolyte comprises KOH at a concentration of 20-53%.

11. The hydrogen generator as claimed in claim 4, wherein said tabs extend outside of said inner electrolysis chamber to receive said electrode support rods within said electrolysis chamber outside of said inner electrolysis chamber.

12. A method for supplementing fuel in an internal combustion engine, the method comprising the step of supplementing the fuel with the hydrogen and oxygen gases generated by the hydrogen generator as claimed in claim 1.

* * * * *

UNITED STATES PATENT AND TRADEMARK OFFICE
CERTIFICATE OF CORRECTION

| | | |
|---|---|---|
| PATENT NO. | : 9,611,553 B2 | Page 1 of 1 |
| APPLICATION NO. | : 13/664551 | |
| DATED | : April 4, 2017 | |
| INVENTOR(S) | : Dejan Pavlovic and Nenad Pavlovic | |

It is certified that error appears in the above-identified patent and that said Letters Patent is hereby corrected as shown below:

In the Specification

Column 1, Line 47 reading "ah improved process and apparatus for decomposition of" should read "an improved process and apparatus for decomposition of"

Column 2, Line 17 reading "each, other. Preferably, the slots in one pair of radial slots" should read "each other. Preferably, the slots in one pair of radial slots"

Column 2, Line 37 reading "securing the first front cover to the main, body, a second" should read "securing the first front cover to the main body, a second"

Column 2, Line 53 reading "trode support, rod and the negative electrode support rod to" should read "trode support rod and the negative electrode support rod to"

Column 3, Line 6 reading "electrode support, rod, and said platinum plate having a" should read "electrode support rod, and said platinum plate having a"

Column 3, Line 9 reading "of one pair of opposed radial slots has a keyhole shape with," should read "of one pair of opposed radial slots has a keyhole shape with"

Column 3, Line 30 reading "FIG. 6 is a trout perspective view of the electrolysis cell" should read "FIG. 6 is a front perspective view of the electrolysis cell"

Signed and Sealed this
Eighteenth Day of July, 2017

Joseph Matal
*Performing the Functions and Duties of the
Under Secretary of Commerce for Intellectual Property and
Director of the United States Patent and Trademark Office*